Aug. 16, 1938.　　　M. G. KURTH　　　2,127,036
PISTON RING
Filed Oct. 2, 1935
Fig. 1.　　Fig. 2.　　Fig. 3.
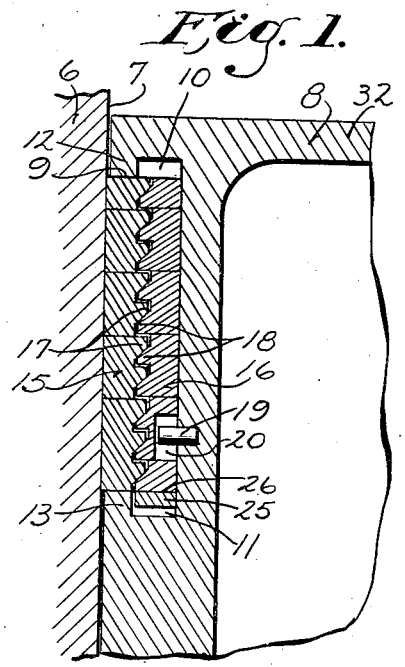
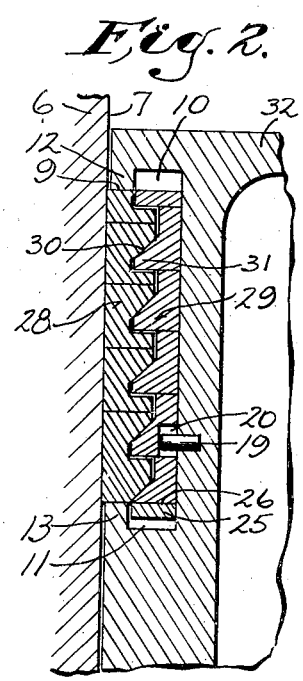
Fig. 4.
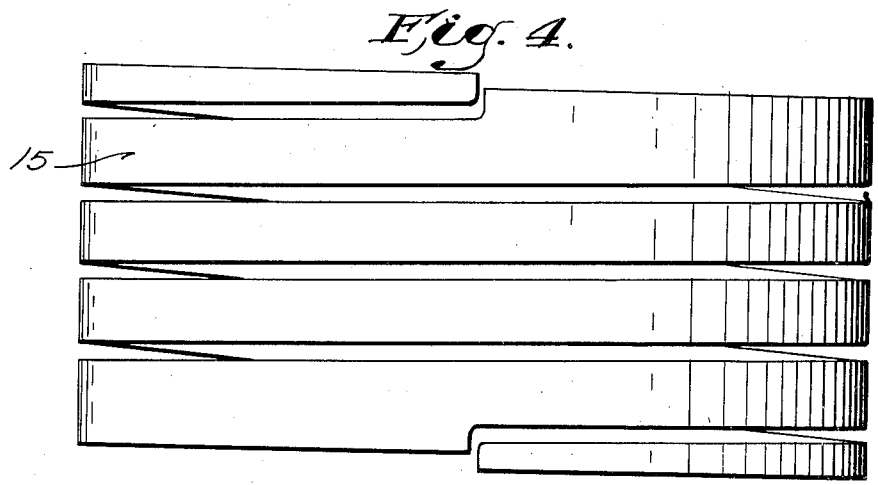
Fig. 5.
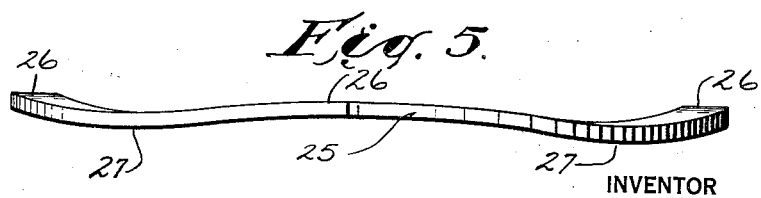
INVENTOR
Matthew G. Kurth
BY Wheler, Wheler and Wheler
ATTORNEYS Patented Aug. 16, 1938

2,127,036

UNITED STATES PATENT OFFICE 2,127,036

PISTON RING

Matthew G. Kurth, Madison, Wis.

Application October 2, 1935, Serial No. 43,186

8 Claims. (Cl. 309—30)

This invention relates to improvements in piston rings.

It is the primary object of the invention to provide a novel and improved piston ring construction in which a compound helix is used as a packing ring, with separate spring means for subjecting one of the helices to axial pressure, the two helices having complementary beveled surfaces such that axial pressure on one will tend to produce a change in the diametrical dimension of the other.

In the drawing:

Figure 1 is a fragmentary view in vertical axial section through adjacent portions of a piston and cylinder, showing applied to the piston a compound packing ring embodying the present invention.

Figure 2 is a view similar to Figure 1 showing a modified embodiment of the invention.

Figure 3 is a view similar to Figure 1 showing a further modified embodiment.

Figure 4 is an enlarged detail view in side elevation of one of the helices employed in one compound ring.

Figure 5 is a view in side elevation of one form of spring which I may use in my packing ring.

Like parts are identified by the same reference characters throughout the several views.

I have shown at 6 a fragment of the cylinder wall provided with a bore 7 in which the piston 8 operates conventionally. The piston 8 has an annular groove at 9 to receive my improved compound ring, the groove being under-cut to enlarge it upwardly at 10 and downwardly at 11 inside of the annular flanges 12 and 13 respectively.

My improved packing ring consists of a pair of helices 15 and 16 in concentric relation. With their several coils closely nested their length is such as just to pass between the annular flanges 12 and 13 of the piston, while their combined thickness is just equal to the depth of the groove 9.

The helices are provided with complementary threads 17 and 18 having mutually beveled surfaces as clearly shown in Fig. 1. In Fig. 1 there are two threads in each coil of each helix. The inner helix may conveniently be fixed against rotation while permitted a moderate degree of axial movement by means of the pin 19 engaged in a notch 20 in the interior periphery of helix 16.

In the under-cut portion 11 of groove 9 I dispose an annular spring 25 in the form of a split ring which, instead of being planiform, has portions of its periphery offset axially at regular intervals to produce a waved or undulating effect having alternate crests projecting upwardly as at 26 and downwardly as at 27.

I have found that packing rings are increasingly effective if made of different metals from the surfaces with which they co-act. Accordingly, if the cylinder 6 and piston 8 are made of cast iron, one or both of the packing ring helices 15 and 16 will be made of brass or bronze, it being particularly advantageous that the helix 15 should be made of such materials. This is entirely feasible for the reason that neither of the helices 15 or 16 is required to have any appreciable resilience of its own, all pressure being furnished by the spring 25 which is preferably made of spring steel, although it may also be made of cast iron, which has a substantial degree of resilience.

The difference in level between the upper crest 26 and the downward crest 27 of the spring ring 25 is sufficient so that this ring is subjected to resilient distortion when the parts are assembled as shown in Fig. 1. Thus, the upward pressure of the spring ring on the lowermost coil of the inner helix 16 will cause each of the beveled surfaces of the threads 18 to exert an outward and upward pressure on the complementary threads 17 of the outer packing helix 15. Since the packing helix 15 cannot move upwardly beyond its position of engagement with the annular flange 9, its successive turns are all acted upon more or less uniformly in a radial direction to expand the diameter of the outer packing ring 9 to maintain its outer periphery in intimate pressure contact with the wall of the cylinder 6. The uncut upward extension 10 of groove 9 provides ample clearance for the movement of the inner helix 16 to any desired extent necessary to take up wear and to maintain the pressure referred to.

The construction shown in Fig. 2 is identical with that illustrated in Fig. 1 with the exception that the helical packing rings 28 and 29 have only a single thread in pressure engagement, the outer ring 28 being provided with a helical groove providing a beveled surface at 30 with which the correspondingly beveled surface of the single thread 31 on the helix 29 co-acts. The functioning of the parts is essentially the same.

Likewise, in Fig. 3 the functioning of the parts is identical with that disclosed in Fig. 1 and Fig. 2, but in this case the inner helix 290 is fabricated of sheet metal and is hollow, as clearly shown in the drawing, to minimize heat transmission through the piston from the piston head 32 to the hollow ring 290. The single helical thread provided on the ring 290 is shown at 310 and corresponds in function with the thread 31 of Fig. 2.

While I have shown my improved packing applied to the exterior of the piston, it will readily be understood by those skilled in the art how a converse arrangement could be applied to the cylinder.

I claim:

1. The combination with a member having a cylindrical bearing surface provided with a groove under-cut at at least one of its ends to leave a flange adjacent said surface, of a first helix provided with a bearing surface aligned with that of said member, said helix being positioned in said groove, a second helix behind the first helix in said groove, said helices having complementary beveled portions in pressure engagement, and an axial compression spring in an under-cut portion of said groove acting axially on an end of said second helix, whereby to maintain said beveled portions under thrust and to develop a radial pressure at the bearing surface of the first mentioned helix.

2. A piston ring comprising a helix of copper-bearing and relatively non-resilient material having on one periphery a bearing surface and having on the other periphery a helical bevel, of a second helix concentric with the first and having an opposed co-acting bevel on its periphery adjacent said first helix, and a ring of iron-bearing and highly resilient material provided with convolutions and subject to compression, said ring acting axially on said second helix in a direction to subject the bearing surface of the first helix to radial pressure.

3. A device of the character described comprising a pair of complementary and mutually concentric helices having their adjacent peripheral portion each provided with a plurality of threads beveled for thrust engagement and of less axial extent than the said portions upon which they are mounted, together with a packed member providing resilient means yieldably acting axially upon one of said helices.

4. The combination with a member having a cylindrical bearing surface provided with a groove under-cut at at least one of its ends to leave a flange adjacent said surface, a first helix having its ends axially confined in said groove and provided with a helical thread having a surface beveled toward the under-cut portion of said groove, a second helix having an end exposed in the under-cut portion of said groove and having a thread beveled complementary to that of the first helix and engaged therewith, and an axial compression spring in the under-cut portion of the groove acting on the exposed end of the second helix in a direction such that the reaction of the thread portions of the respective helices will tend to expand the first helix in a radial direction.

5. The combination with a member requiring packing and provided with a positive stop, of a helix encircling said member and having its end engaged by said stop, a second helix concentric with the first helix, said helices having complementary beveled cam portions in operative engagement and said member being provided with clearance for the axial movement of said second helix with respect to said stop, and a spring seated against said member and said second helix under compression in a direction axially of the second helix whereby to act upon said helices to maintain their respective cam surfaces in engagement and to tend to expand their combined width.

6. The combination with a member requiring packing and provided with a stop, of a helix having one end seated against said stop, a second helix concentric with the first helix and provided with a spring acting upon it axially toward said stop, said stop being disposed out of the path of movement of said second helix under the pressure of said spring and said helices having complementary cam surfaces tending to expand their combined width under pressure of said spring, and means engaged between one of said helices and said member confining said last mentioned helix against rotation while permitting it to move axially.

7. A device of the character described comprising the combination with a packing helix and an expanding helix in concentric relation and provided with complementary cam surfaces for the expansion of the combined width of said helices upon relative axial movement therebetween, and a packed member provided with spring and stop means engaged with the respective helices for inducing relative axial movement between said helices, the expander helix being disposed between the packing helix and the packed member and comprising a hollow body, whereby to reduce heat transfer between the packing helix and the packed member.

8. Packing comprising the combination with a packing ring having an exposed bearing surface, of a expander ring wholly confined within the packing ring and comprising a hollow sheet metal structure, the respective rings having complementary beveled portions for expansion of said packing ring upon axial displacement between said rings, and means for inducing such axial displacement, the hollow expander ring being adapted to provide substantial thermal insulation against heat transfer inwardly from said packing ring.

MATTHEW G. KURTH.